United States Patent [19]

Saldick et al.

[11] 4,285,915

[45] Aug. 25, 1981

[54] RECOVERY OF ALKALI VALUES FROM TRONA ORE

[75] Inventors: Jerome Saldick, Princeton; Bernard Cohen, Trenton, both of N.J.

[73] Assignee: Intermountain Research and Development Corp., Green River, Wyo.

[21] Appl. No.: 142,918

[22] Filed: Apr. 23, 1980

[51] Int. Cl.³ .................... C22B 26/10; C01D 7/00; F21B 43/28

[52] U.S. Cl. .................... 423/206 T; 23/302 T; 299/5; 423/421

[58] Field of Search .................... 423/421, 206 T, 422, 423/426, 427, 560; 23/302 T, 293 R; 299/5

[56] References Cited

U.S. PATENT DOCUMENTS

| | | | |
|---|---|---|---|
| 2,376,433 | 5/1945 | Julien et al. | 423/560 |
| 2,376,434 | 5/1945 | Koenig | 423/560 |
| 2,376,435 | 5/1945 | Saddington | 423/560 |
| 3,119,655 | 1/1964 | Frint et al. | 423/206 T |
| 3,184,287 | 5/1965 | Gancy | 423/206 T |
| 3,211,519 | 10/1965 | Roberts et al. | 423/206 T |
| 3,245,755 | 4/1966 | Comer et al. | 23/302 T |
| 3,273,959 | 9/1966 | Miller | 423/206 T |
| 3,606,466 | 9/1971 | Fernandes | 423/206 T |
| 3,656,892 | 4/1972 | Bourne et al. | 423/206 T |
| 3,953,073 | 4/1976 | Kube | 423/206 T |

Primary Examiner—Gary P. Straub
Attorney, Agent, or Firm—George F. Mueller; Frank Ianno

[57] ABSTRACT

Alkali values are recovered in a cyclic method from mechanically mined trona ore or from trona deposits by a solution mining technique utilizing a solvent comprising an aqueous solution of sodium sulfide. The ore is solubilized as sodium carbonate which is precipitated as sodium sesquicarbonate and/or sodium bicarbonate by treating the solution with hydrogen sulfide and the precipitated salt separated from the mother liquor. In the process, sodium sulfide and hydrogen sulfide become converted into sodium hydrosulfide which is contained in the mother liquor. Heat treatment of the mother liquor converts the sodium hydrosulfide into sodium sulfide thereby regenerating a solution of sodium sulfide which is recycled to the trona ore and into hydrogen sulfide which is evolved and recycled to the sodium carbonate solution.

19 Claims, 3 Drawing Figures

RECOVERY OF ALKALI VALUES FROM TRONA ORE

This invention relates to the recovery of alkali values from trona ore. More particularly, the trona is solubilized with an aqueous solvent containing sodium sulfide and the alkali values contained in the solution are ultimately recovered as soda ash.

More soda ash (sodium carbonate) produced in the United States is obtained from naturally-occurring subterranean trona ore deposits in Wyoming, which consist mainly of sodium sesquicarbonate, $Na_2CO_3 \cdot NaHCO_3 \cdot 2H_2O$. At the present time, these trona deposits are mechanically mined and the trona converted to soda ash by either the sesquicarbonate process or the monohydrate process, whose features are summarized in U.S. Pat. No. 3,528,766.

Currently-employed soda ash processes utilize only those trona deposits which are recoverable by mechanical mining and which are relatively low in soluble, nonsesquicarbonate impurities, such as chlorides and sulfates. Large trona deposits exist in the same area which are associated with substantial amounts of sodium chloride, containing up to 10% or more by weight NaCl. By contrast, trona deposits presently being worked ordinarily contain less than 0.1% by weight sodium chloride, 0.04%–0.08% NaCl being typical. Soda ash has not previously been prepared from salt-containing subterranean Wyoming trona deposits because of the depth of the deposits, which precludes their being mechanically mined. The subterranean trona beds located in southwestern Wyoming constitute the world's largest known reserves of trona and have heretofore remained unexploited because of their substantial salt content.

The existence of problems associated with the presence of sodium chloride in trona deposits is evidenced by the fact that no salt-containing underground Wyoming trona deposits are being mined in commercial soda ash operations, as well as by the disclosures in U.S. Pat. Nos. 3,119,655 and 3,273,959 which relate to the dissolution of low salt (<0.1% NaCl) trona.

The present invention provides an economical method of preparing a relatively pure soda ash product by utilizing an aqueous solvent to recover the alkali values from trona regardless of the salt content of the trona.

In accordance with the present invention, alkali values are recovered from underground trona ore deposits in a method which comprises introducing into the region of the trona deposit an aqueous mining solvent having dissolved therein sodium sulfide, maintaining the solvent in the region to solubilize trona as sodium carbonate until the solvent comes essentially into an equilibrium with the sodium sesquicarbonate, withdrawing at least a portion of the resulting mining solution from the region and recovering alkali values from the withdrawn solution.

The trona ore in an alternative procedure may be mechanically mined and the mined ore treated with an aqueous solvent containing from about 3 to about 8% by weight sodium sulfide in a manner analogous to the method employed with underground trona deposits.

Figure 1:
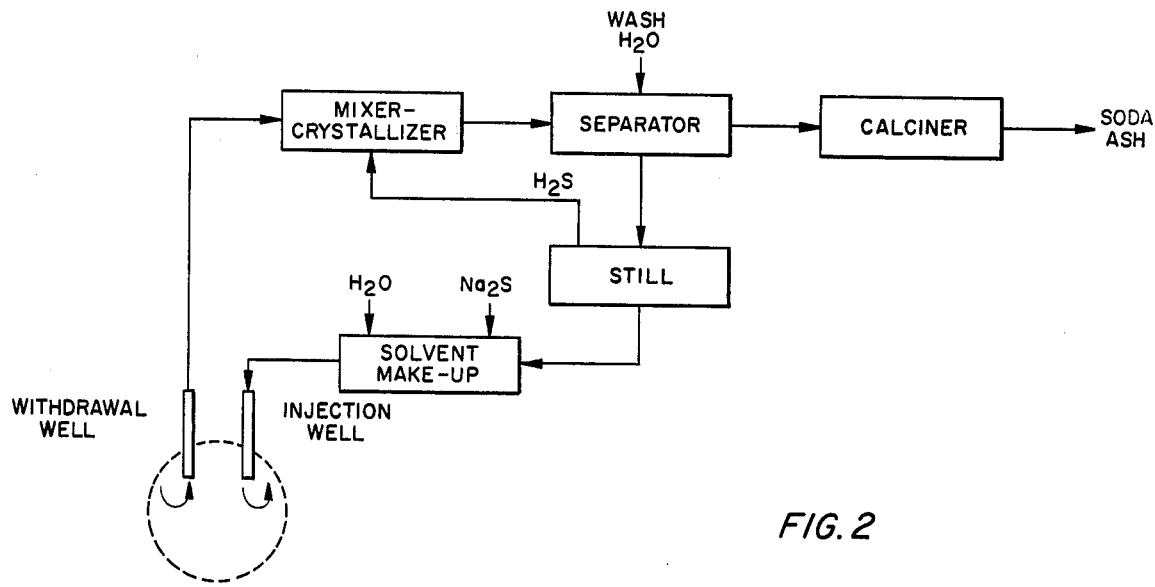
FIG. 1 is a flowsheet depicting a preferred embodiment of the method in which soda ash is recovered from an underground trona deposit.

A preferred recovery method of this invention involves introducing into the region of the trona deposit an aqueous mining solvent having dissolved therein from about 3 to about 8% by weight sodium sulfide; maintaining the solvent in the region to solubilize trona as sodium carbonate until the solvent comes essentially into an equilibrium with the sodium sesquicarbonate and withdrawing from the region at least a portion of the resulting mining solution. The withdrawn mining solution is treated with hydrogen sulfide so as to convert the sodium carbonate to sodium sesquicarbonate and sodium bicarbonate which are crystallized and the crystallized solid is separated from the mother liquor. The mother liquor contains sodium carbonate, sodium sesquicarbonate, sodium hydrosulfide and hydrogen sulfide.

In the preferred method, the mother liquor is treated to regenerate a mining solvent which is recycled to the region of the trona ore. In the solubilization of the sodium sesquicarbonate to sodium carbonate the sodium sulfide is converted to sodium hydrosulfide. During the treatment of the withdrawn mining solution the major portion of the dissolved sodium carbonate reacts with the hydrogen sulfide to form sodium sesquicarbonate which is precipitated and sodium hydrosulfide. Some sodium carbonate will react with the hydrogen sulfide to form sodium bicarbonate which is precipitated and sodium hydrosulfide. Following the separation of the crystallized solids, the mother liquor is subjected to distillation. Hydrogen sulfide dissolved in the liquor is evolved. Any sodium bicarbonate present in the liquor will react with sodium hydrosulfide to form sodium carbonate and hydrogen sulfide which is evolved. The sodium hydrosulfide is decomposed to reconstitute the sodium sulfide and to form hydrogen sulfide which is evolved. The evolved hydrogen sulfide is recycled to the withdrawn mining solution. To reconstitute the mining solvent, sufficient water is added to compensate for water losses resulting from crystallization and separation of the crystallized solids, for that which may be lost during distillation and for the volume of solvent remaining in the region of the trona deposit. Sodium sulfide is added to compensate for that remaining in the mining solution which occupies the volume of trona removed.

The resulting reconstituted mining solvent is reintroduced into the region of the trona deposit and the cycle of recovery repeated.

Soda ash is preferably recovered as the alkali product from the crystallized sodium sesquicarbonate and sodium bicarbonate by calcination of the crystallized solids in a conventional calciner.

The method of this invention is well suited for solution mining of the large trona deposits that exist in southwestern Wyoming whether or not the deposits are associated with sodium chloride. Although the salt-free deposits are generally located about 1500 feet or less below the surface and are presently mined, the method of this invention may be utilized for solution mining these deposits. The deposits associated with high amounts of salt are generally found in beds from about 2000 to 4000 feet below the surface. The depth of these beds precludes the use of conventional mechanical methods to recover the salt-containing trona.

Where sodium chloride is associated with trona it varies in amount and its degree of intermixture with the trona. Deposits containing 3% up to 10% or more by weight sodium chloride are generally considered to be associated with substantial amounts of salt. Because the interlayered trona seams in the deeper beds of salt-containing trona are thick, numerous and relatively close together, the recovery of alkali values therefrom is facilitated by the method of this invention which utilizes an aqueous solvent introduced to the region of the trona deposits by solution mining techniques.

It is well known that sodium chloride reduces the solubility of sodium carbonate in water slightly, but that it reduces substantially the solubility of sodium sesquicarbonate and sodium bicarbonate. Thus, the yield of recovered alkali values by precipitation per unit of recovered mining solution is not decreased significantly by the presence of sodium chloride associated with the trona deposit.

Although the aqueous solvent is preferably introduced into the region of the trona deposits, especially where the deposit is associated with substantial amounts of sodium chloride, the alternative embodiment of the invention provides for contacting mechanically mined ore with the aqueous solvent. After the aqueous solvent has been maintained in contact with the trona ore for a period of time sufficient to come into an equilibrium with the sodium sesquicarbonate, the solution is withdrawn from the region of the underground trona deposit (solution mining technique) or from the mined trona and the separated solution treated to recover the alkali values.

The aqueous solvent employed in the method of this invention contains from about 3 to about 8% by weight sodium sulfide, preferably from 4 to 7%. Recycled aqueous solvent contains sodium sulfide and sodium carbonate produced during regeneration of the solvent. In solution mining, other soluble impurities such as sulfates, chlorides, borates and phosphates do not accumulate in appreciable concentrations in the regenerated aqueous solvent. This is accounted for by the fact that the volume of solvent which remains in the cavity to replace the dissolved trona functions as a purge stream.

The temperature of the solvent is not critical, temperatures of from 20° to 80° C. being satisfactory. In surface treatment of mechanically mined trona, the solvent temperature preferably is between 30° and 50° C. to provide for maximum solubility of sodium carbonate. Higher temperatures may be used but are less practical because of the decreased solubility of sodium carbonate and because of the energy costs required. In solution mining, the solvent may be introduced at temperatures around 30° C. without significant heat losses. Trona deposits that are 2,000 feet and more below the surface generally have a temperature of about 25°–35° C. and the ground temperature increases for deeper deposits.

Upon startup, an aqueous solution containing the proper sodium sulfide content is employed as the solvent until sufficient regenerated solvent can be prepared from the solution following recovery of the alkali values.

The aqueous mining solvent is desirably introduced into the region of the underground trona deposits by means of one or more wells using conventional solution mining techniques. An alternative to the preferred solution mining technique involves mechanical mining of the subterranean trona ore, followed by treatment of the mined ore with a solvent similar to the aqueous mining solvent in a surface treatment operation. The economics of solution mining with the aqueous mining solvent, however, favor this procedure over presently employed mechanical mining methods.

A single solution mining well ordinarily has an injection pipe and withdrawal pipe. Separate injection and withdrawal wells may be used, the two types desirably being spaced apart, located from a few hundred to one thousand feet apart, and being connected via underground fractures in the trona formation through which the aqueous mining solvent may pass.

Introduction of the aqueous mining solvent to the region of a salt-containing trona ore deposit results in the formation of a solution which comes into equilibrium with the sodium sesquicarbonate and possibly with sodium chloride if present. The concentration of sodium chloride will be dependent primarily upon the amount present with the trona.

Although sodium chloride reduces substantially the solubility of sodium sesquicarbonate, the aqueous mining solvent overcomes the marginal solubility of trona by the reaction with sodium sulfide to form soluble sodium carbonate. The sodium chloride reduces the solubility of sodium carbonate but slightly and thus has no significant affect on the recovery of the alkali values.

The dissolution of the trona by its reaction with sodium sulfide results in the release of water of hydration from the trona which dilutes the aqueous solvent and may improve slightly the dissolving rate of the trona. Also, the reaction of the sodium sulfide in the solvent with the trona is mildly exothermic, and in the case of solution mining, provides a source of localized heating which maintains the desired temperature and also promotes convective circulation of the solution to increase the rate of dissolution of the sodium sesquicarbonate.

In the practice of solution mining, at least a portion of the aqueous mining solvent that is introduced into the region of the trona deposits is withdrawn as mining solution, having a composition and characteristics as noted above. It should be apparent that recovery of mining solution in an amount or rate equivalent to the amount or rate of solvent introduced may not be feasible in a continuous, sustained operation. It is estimated that approximately onetenth of the introduced solvent will remain behind in the cavity left by dissolved trona since such solvent replaces dissolved trona which is withdrawn in the mining operation. The contribution of the water from the hydrated water of the dissolved sodium sesquicarbonate and as a byproduct of the sodium sulfide-sodium sesquicarbonate reaction does not appreciably offset these losses of mining solvent which replace dissolved trona.

The solution mining of trona ore deposits with an aqueous solvent containing the preferred 4 to 8% by weight sodium sulfide can result in about 0.2 lb. sodium carbonate per gallon of solution withdrawn from the ground.

The operations involved in the solution mining of subterranean trona deposits to recover sodium sesquicarbonate and sodium bicarbonate and ultimately soda ash are illustrated in the flow diagram of FIG. 1.

The mining solution withdrawn from the region of the trona deposit is introduced into suitable vessel (MIXER-CRYSTALLIZER) wherein the solution is treated with hydrogen sulfide. The vessel preferably constitutes a gas-liquid mixer. The mining solution comprises an aqueous solution of sodium carbonate and sodium hydrosulfide. As the hydrogen sulfide is added and mixed with the mining solution, the pH of the solution is lowered and the sodium carbonate is converted into sodium sesquicarbonate and sodium bicarbonate which are precipitated. In the reaction between hydrogen sulfide and sodium carbonate the hydrogen sulfide is converted into sodium hydrosulfide. The nature of the precipitated sodium salt is dependent upon the pH of the solution. At pH's above about 9.70, sodium sesquicarbonate is precipitated. At pH's below about 9.70, sodium sesquicarbonate and sodium bicarbonate are precipitated. In general, as the amount of hydrogen sulfide introduced is increased and the pH of the solution decreases, the greater the proportion of sodium bicarbonate produced. Any other soluble salts, if present, such as sodium chloride, borates, sulfates and the like derived from the impurities associated with the trona remain in solution.

The precipitated crystalline material is separated from the mother liquor as illustrated (SEPARATOR) in FIG. 1. Separation may be effected with a centrifuge, gravity separator and filter or other suitable conventional, solid-liquid separation equipment. The separated crystalline material is preferably washed with water and the wash water added to the mother liquor.

The recovered sodium sesquicarbonate and sodium bicarbonate are converted into soda ash in a CALCINER as shown in FIG. 1. The calciner may be gas fired, steam tube or fluid bed conventional calciner.

The mother liquor after separation of the crystalline material is regenerated to form an aqueous mining solvent which may then be recycled to the region of the trona deposit. The mother liquor contains sodium carbonate, sodium bicarbonate, sodium hydrosulfide and hydrogen sulfide. The mother liquor is subjected to distillation, as in STILL, FIG. 1, whereby the hydrogen sulfide is evolved. Any sodium bicarbonate present in the liquor will react with sodium hydrosulfide to form sodium carbonate and hydrogen sulfide which is evolved. Sodium hydrosulfide is decomposed to form sodium sulfide and hydrogen sulfide which is evolved. The evolved hydrogen sulfide is recycled to the MIXER-CRYSTALLIZER.

To the resulting aqueous solution of sodium sulfide make-up water and sodium sulfide are added to provide the desired sodium sulfide concentration, (SOLVENT MAKE-UP) FIG. 1. Wash water from the crystal separation step may constitute a portion of the make-up water. A portion of the added water serves to replace water losses occurring during crystallization and water losses from separation of the crystallized material from the mother liquor. Additional water and sodium sulfide are added to compensate for the aqueous solvent which replaces the volume of dissolved trona. The reconstituted mining solvent is reintroduced to the region of the trona deposit, (INJECTION WELL) FIG. 1.

The presence of salt with the trona deposit has no significant affect on the recovery of alkali values by the practice of the present method. While the solubility of sodium sesquicarbonate is reduced substantially by the presence of sodium chloride, the present method involves the solubilization of trona as sodium carbonate the solubility of which is decreased but slightly. The salt concentration in the mining solution will remain relatively constant and will be in equilibrium with the salt associated with the trona. The salt will remain dissolved in the mining solution as it travels through the cycle and will not build up since upon reinjection to the region of the trona that protion which replaces dissolved trona functions as a purge stream.

Figure 2:
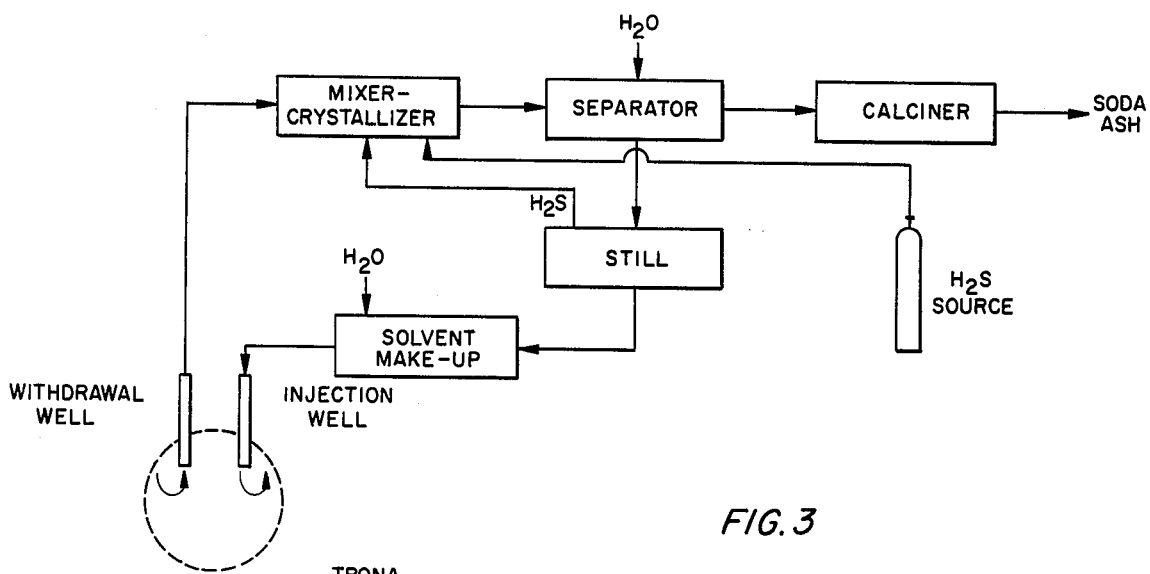
FIG. 2 is a flowsheet depicting a modification of the method as illustrated in FIG. 1; and, FIG. 3 is a flowsheet depicting an embodiment of the method in which soda ash is recovered from mechanically mined trona ore.

In the modification illustrated in FIG. 2, the mining solution withdrawn from the well is treated in the MIXER-CRYSTALLIZER with an additional quantity of hydrogen sulfide supplied from an external source. In the Wyoming area of trona deposits and adjacent thereto, are found gas wells from which sour gas evolves. This gas may be used as the source of the additional hydrogen sulfide. As excess hydrogen sulfide is mixed with the withdrawn mining solution, the pH of the solution is lowered and the relative proportion of sodium bicarbonate increases and increases the amount of sodium hydrosulfide formed.

As in the method depicted in FIG. 1, following treatment of the solution with hydrogen sulfide and precipitation of sodium sesquicarbonate and sodium bicarbonate, the crystallized material is separated from the mother liquor. After washing the separated crystallized material it is calcined to form soda ash.

The mother liquor is regenerated to form an aqueous mining solvent which is recycled to the region of the trona deposit. The mother liquor is subjected to distillation, as in the STILL, FIG. 2, whereby hydrogen sulfide is evolved. Sodium hydrosulfide is decomposed to sodium sulfide and hydrogen sulfide which is evolved. The evolved hydrogen sulfide is recycled to the MIXER-CRYSTALLIZER.

The amount of hydrogen sulfide added from the external hydrogen sulfide source, such as sour gas, is sufficient to form an amount of sodium hydrosulfide during the conversion of the sodium carbonate in the mining solution to provide for the required sodium sulfide in the mining solvent. This type of operation eliminates the need of supplying added sodium sulfide to compensate that remaining in the mining solution as replacement for the dissolved trona. Make-up water is added to replace water losses during crystallization and water losses from separation of the crystallized material from the mother liquor. Water is also added to compensate for the solvent which replaces dissolved trona.

In an alternative practice of the method of the invention, mechanically mined trona is utilized. The operations are illustrated diagrammatically in FIG. 3.

Trona ore is fed to a suitable CRUSHER, such as a hammer mill, and the crushed ore transferred to a suitable vessel, DISSOLVER, where it is treated with an aqueous solvent containing sodium sulfide. The concentration of sodium sulfide may be as described above. The temperature may be from about 30° to 50° C., preferably at least 30° C.

The resulting solution comparable to the withdrawn mining solution is passed to a suitable gas-liquid mixer, MIXER-CRYSTALLIZER, wherein hydrogen sulfide is mixed with the solution. As described above, as the hydrogen sulfide is mixed with the solution, the pH of the solution is decreased and the sodium carbonate is converted into sodium sesquicarbonate and sodium bicarbonate which precipitate. The relative proportions of sodium sesquicarbonate and sodium bicarbonate produced may be controlled by the amount of added hydrogen sulfide.

Figure 3:
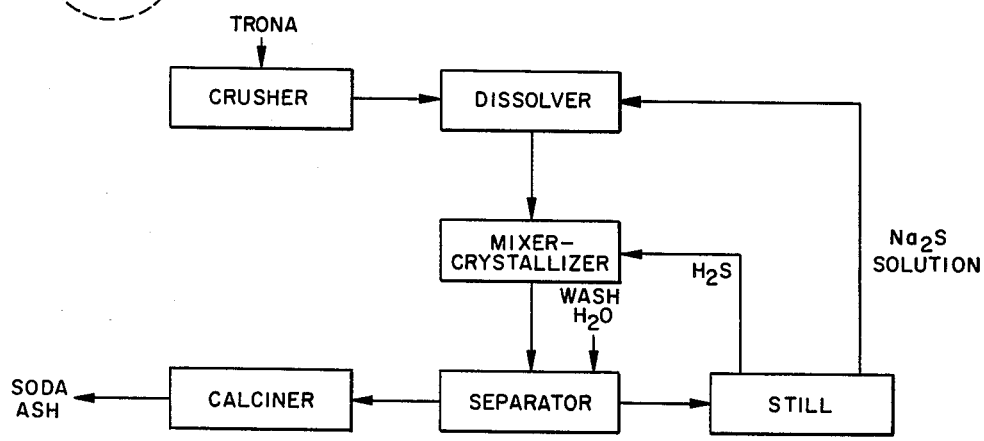

The precipitated salts are separated from a mother liquor (SEPARATOR) as illustrated in FIG. 3. Preferably, the separated crystalline material is washed with water. The recovered sodium sesquicarbonate and sodium bicarbonate are converted into soda ash in a CAL- CINER which may be gas fired, steam tube or fluid bed conventional calciner.

The mother liquor separated from the crystalline material is subjected to distillation, as in a STILL, FIG. 3, whereby hydrogen sulfide is evolved which is recycled to the MIXER-CRYSTALLIZER and mixed with additional solution of trona. The sodium hydrosulfide is decomposed to form hydrogen sulfide which is evolved and sodium sulfide thereby regenerating the solvent.

We claim:

1. A method for recovering alkali values from trona which comprises
   (i) contacting the trona with an aqueous solvent containing from about 3 to about 8% by weight sodium sulfide;
   (ii) maintaining the solvent in contact with the trona for a period sufficient to solubilize at least a portion of the trona as sodium carbonate whereby sodium sulfide is converted into sodium hydrosulfide;
   (iii) separating at least a portion of the resulting solution containing sodium carbonate and sodium hydrosulfide from the trona; and
   (iv) recovering alkali values from the separated solution.

2. The method of claim 1 wherein the trona is mechanically mined trona ore.

3. The method of claim 1 or 2 wherein the aqueous solvent contains from about 3 to about 8% sodium sulfide.

4. The method of claim 1, 2 or 3 wherein the aqueous solvent contains from 4 to 7% sodium sulfide.

5. The method of claim 1 wherein
   (i) the separated solution obtained in step (iii) of claim 1 is treated with hydrogen sulfide to convert the major portion of the sodium carbonate into a sodium salt selected from the group sodium sesquicarbonate, sodium bicarbonate and mixtures thereof, the salt or mixtures thereof being precipitated and whereby the hydrogen sulfide is converted into sodium hydrosulfide; and
   (ii) the precipitated sodium salt is separated from the mother liquor containing sodium hydrosulfide.

6. The method of claim 5 wherein in step (i) of claim 5 the major portion of the sodium carbonate is converted into a mixture of sodium sesquicarbonate and sodium bicarbonate.

7. The method of claim 5 wherein in step (i) of claim 5 the major portion of the sodium carbonate is converted into sodium sesquicarbonate.

8. The method of claim 5 wherein in step (i) of claim 5 the major portion of the sodium carbonate is converted into sodium bicarbonate.

9. The method of claim 5 wherein the separated sodium salt obtained in step (ii) of claim 5 is calcined to form soda ash.

10. The method of claim 5 wherein the mother liquor obtained in step (ii) of claim 5 is subjected to distillation whereby the sodium hydrosulfide is converted into hydrogen sulfide and sodium sulfide.

11. The method of claim 1 wherein:
    (i) the separated solution obtained in step (iii) of claim 1 is treated with hydrogen sulfide to convert the major portion of the sodium carbonate into a sodium salt selected from the group sodium sesquicarbonate, sodium bicarbonate and mixtures thereof, the salt or mixtures thereof being precipitated and whereby the hydrogen sulfide is converted into sodium hydrosulfide;
    (ii) the precipitated sodium salt is separated from the mother liquor containing sodium hydrosulfide;
    (iii) the mother liquor obtained in step (ii) is subjected to distillation whereby the sodium hydrosulfide is converted into hydrogen sulfide and sodium sulfide;
    (iv) the hydrogen sulfide obtained in step (iii) is recycled to step (i); and
    (v) the sodium sulfide obtained in step (iii) is recycled to step (i) of claim 1.

12. A method of recovering alkali values from a subterranean trona deposit which comprises
    (i) introducing into the region of the trona deposit an aqueous mining solvent containing from about 3 to about 8% sodium sulfide;
    (ii) maintaining the solvent in the region to solubilize at least a portion of the trona as sodium carbonate whereby sodium sulfide is converted into sodium hydrosulfide;
    (iii) withdrawing from the region at least a portion of the resulting mining solution containing sodium carbonate and sodium hydrosulfide;
    (iv) treating the withdrawn mining solution with hydrogen sulfide to convert the major portion of the sodium carbonate into a sodium salt selected from the group sodium sesquicarbonate, sodium bicarbonate and mixtures thereof, the salt or mixtures thereof being precipitated and whereby the hydrogen sulfide is converted into sodium hydrosulfide;
    (v) separating the precipitated sodium salt from the mother liquor containing sodium hydrosulfide;
    (vi) subjecting the mother liquor to distillation whereby the sodium hydrosulfide is converted into hydrogen sulfide and sodium sulfide which remains dissolved in mother liquor;
    (vii) recycling the hydrogen sulfide to step (iv);
    (viii) adding water and sodium sulfide to the mother liquor obtained in step (vi) to reconstitute the mining solvent; and
    (ix) recycling the reconstituted mining solvent to step (i) and repeating the cycle of recovery.

13. The method of claim 12 wherein the separated sodium salt obtained in step (v) is calcined to form soda ash.

14. The method of claim 12 wherein in step (iv) the major portion of the sodium carbonate is converted into a mixture of sodium sesquicarbonate and sodium bicarbonate.

15. The method of claim 14 wherein the mixture of sodium sesquicarbonate and sodium bicarbonate is calcined to form soda ash.

16. The method of claim 12 wherein in step (viii) sufficient water is added to compensate for water losses in steps (v) and (vi) and for that remaining in the region of the trona deposit to replace removed trona and sufficient sodium sulfide is added to compensate for that dissolved in the solution remaining in the region of the trona deposit to replace removed trona.

17. The method of claim 12 wherein the mining solution is treated with sufficient hydrogen sulfide in step (iv) to form sufficient sodium hydrosulfide which when converted into sodium sulfide in step (vi) supplies the required amount of sodium sulfide to the mother liquor in step (viii).

18. The method of claim 17 wherein the excess hydrogen sulfide is derived from sour gas.

19. The method of claim 3 or 12 wherein the trona deposit is associated with substantial amounts of salt.

* * * * *